United States Patent
Bartels et al.

(10) Patent No.: US 10,252,405 B2
(45) Date of Patent: Apr. 9, 2019

(54) BOLT TENSIONING SYSTEM

(71) Applicant: FORUM US, INC., Houston, TX (US)

(72) Inventors: Heinrich Bartels, Houston, TX (US); Stephen Patterson, Westhill (GB)

(73) Assignee: FORUM US, INC., Houston, TX (US)

( * ) Notice: Subject to any disclaimer, the term of this patent is extended or adjusted under 35 U.S.C. 154(b) by 224 days.

(21) Appl. No.: 15/158,837

(22) Filed: May 19, 2016

(65) Prior Publication Data

US 2017/0334048 A1 Nov. 23, 2017

(51) Int. Cl.
*F16B 31/04* (2006.01)
*B25B 29/02* (2006.01)
*B23P 19/06* (2006.01)
*F16B 39/26* (2006.01)

(52) U.S. Cl.
CPC ............ *B25B 29/02* (2013.01); *B23P 19/067* (2013.01); *F16B 31/04* (2013.01); *F16B 39/26* (2013.01)

(58) Field of Classification Search
CPC .............................. F16B 31/043; F16B 31/04
USPC ......................................... 411/14.5, 915–917
See application file for complete search history.

(56) References Cited

U.S. PATENT DOCUMENTS

| | | | |
|---|---|---|---|
| 3,287,999 A * | 11/1966 | Kreckel | B25B 29/02 254/29 A |
| 3,841,193 A | 10/1974 | Ito | |
| 3,870,439 A | 3/1975 | Stachowiak et al. | |
| 3,877,326 A * | 4/1975 | Kock | B25B 29/02 81/57.38 |
| 3,926,090 A | 12/1975 | Bunker | |
| 3,986,584 A | 10/1976 | Wright et al. | |
| 4,087,074 A | 5/1978 | Massey et al. | |
| 4,277,229 A | 7/1981 | Pacht | |
| 4,395,140 A * | 7/1983 | Sable | B66C 23/84 384/593 |
| 4,411,549 A * | 10/1983 | Sheppard | F16B 31/025 403/258 |
| 4,516,477 A | 5/1985 | Lewis et al. | |
| 4,569,506 A | 2/1986 | Vassalotti | |

(Continued)

FOREIGN PATENT DOCUMENTS

DE 2512780 A1 10/1976
DE 3047674 A1 7/1982

(Continued)

OTHER PUBLICATIONS

Great Britain Combined Search and Examination Report dated Jul. 28, 2017, corresponding to GB1704150.0.

(Continued)

*Primary Examiner* — Flemming Saether
(74) *Attorney, Agent, or Firm* — Patterson + Sheridan LLP (57) ABSTRACT

Embodiments disclosed herein generally relate to a system and method for tensioning a bolt. The bolt tensioning system may be used with variable length connection members, for example studs, in any one or more of the drilling, subsea, and process industries to couple a first member to a second member. The bolt tensioning system may remain coupled to the first member and the second member, while applying tension to all of the bolts at the same time, rather than having to torque or tension each bolt individually. The bolt system may accurately and uniformly tension all bolts in a single operation to provide reliable connections.

14 Claims, 8 Drawing Sheets

(56) References Cited

U.S. PATENT DOCUMENTS

| | | | |
|---|---|---|---|
| 4,723,352 A | 2/1988 | Connolly et al. | |
| 4,725,176 A | 2/1988 | Connolly et al. | |
| 4,729,158 A | 3/1988 | Williams | |
| 5,572,920 A | 11/1996 | Kennedy et al. | |
| 5,779,419 A * | 7/1998 | Kellstrom | F16C 35/063 411/14 |
| 5,904,071 A | 5/1999 | Kennedy et al. | |
| 6,209,445 B1 * | 4/2001 | Roberts, Jr. | F04B 53/168 92/128 |
| RE37,483 E | 12/2001 | Kennedy et al. | |
| 6,763,570 B2 * | 7/2004 | Abbott | B23P 19/067 29/525.01 |
| 6,929,287 B2 | 8/2005 | Flindall | |
| 7,063,490 B2 * | 6/2006 | Ricker | F16B 4/002 411/14 |
| 7,234,388 B2 | 6/2007 | Orr et al. | |
| 7,275,462 B2 * | 10/2007 | Faus | B23P 19/067 254/29 A |
| 7,287,460 B2 | 10/2007 | Riley et al. | |
| 7,367,789 B2 | 5/2008 | Raghavan et al. | |
| 7,658,131 B1 | 2/2010 | Rosa et al. | |
| 7,748,310 B2 | 7/2010 | Kennedy | |
| 7,757,366 B2 | 7/2010 | Vorley et al. | |
| 8,186,263 B2 | 5/2012 | Kennedy | |
| 8,465,268 B2 | 6/2013 | Baxter et al. | |
| 8,480,340 B2 * | 7/2013 | Riestra | F16B 31/043 254/29 A |
| 8,616,590 B2 | 12/2013 | Travis et al. | |
| 9,188,146 B1 | 11/2015 | Trautman et al. | |
| 9,248,532 B2 * | 2/2016 | Wagner | B25B 29/02 |
| 2007/0166121 A1 | 7/2007 | Mynhier et al. | |
| 2012/0063936 A1 | 3/2012 | Baxter et al. | |
| 2012/0180280 A1 | 7/2012 | Psimas | |
| 2013/0263932 A1 | 10/2013 | Baxter et al. | |
| 2014/0083541 A1 | 3/2014 | Chandrasekaran et al. | |
| 2014/0245868 A1 | 9/2014 | Wagner et al. | |
| 2015/0101681 A1 | 4/2015 | Forrest et al. | |
| 2016/0169385 A1 | 6/2016 | Patterson et al. | |
| 2017/0107983 A1 | 4/2017 | Patterson et al. | |
| 2017/0159653 A1 | 6/2017 | Bartels et al. | |
| 2017/0334048 A1 | 11/2017 | Bartels et al. | |

FOREIGN PATENT DOCUMENTS

| | | |
|---|---|---|
| DE | 202006004050 U1 | 6/2006 |
| EP | 0222625 A1 | 5/1987 |
| EP | 1526281 A2 | 4/2005 |
| EP | 2687320 A2 | 1/2014 |
| EP | 3069827 A1 | 9/2016 |
| FR | 2560336 A1 | 8/1985 |
| GB | 2285489 A | 7/1995 |
| GB | 2295433 A | 5/1996 |
| WO | 2000/14406 A2 | 3/2000 |
| WO | 2004/106743 A1 | 12/2004 |

OTHER PUBLICATIONS

International Search Report and Written Opinion dated Jun. 7, 2017, Corresponding to Application No. PCT/US2017/021775.
International Search Report and Written Opinion dated Dec. 19, 2016, corresponding to Application No. PCT/US2016/055951.
International Search Report and Written Opinion dated Apr. 7, 2017, corresponding to Application No. PCT/US2016/064805.
International Search Report and Written Opinion dated Jul. 25, 2016, corresponding to Application No. PCT/US2015/061793.

* cited by examiner

BOLT TENSIONING SYSTEM

BACKGROUND

Field

Embodiments of the disclosure relate to a method and apparatus for tensioning a device to couple a first member to a second member, and more specifically, to a bolt tensioning device for tensioning a connection member to exert a predetermined tension force on a threaded connection.

Description of the Related Art

Many machines and other devices used in large industrial or smaller consumer applications are assembled with bolts which should be tightened to exert a predetermined tension force. For example, flanges or covers may be coupled together via a pattern of bolts, each of which should be tightened to exert a predetermined, uniform, tension force. In such bolt assembly applications it is important that the predetermined tension force to be exerted be accurately achieved. If, for example, the flanges are not uniformly and tightly bolted together, fluid may leak and/or the connected members may be damaged. Furthermore, if the bolts are not tightened to the predetermined specified tension force, they may cause failure by vibrating looser, however, if the bolts are over-tightened they become over-stressed and fail by sudden rupture.

Increased bolt tension can be achieved by tensioning rather than torqueing the bolts since the entire installation load is used to place the stud in tension rather than in both torsion as well as tension. When torqueing bolts, it is difficult to achieve accurate tension due the friction found between the nut, the stud, and the other members being compressed. Bolt tensioning systems are currently in use, but are generally used as tools rather than as permanent fixtures in the bolting system. Furthermore, these can generally only be utilized to tension one bolt at a time.

Thus, there is a continuing need for an improved bolt tensioning system which accurately and uniformly tensions bolts when coupling flanges, as well as other types of connections, quickly, simultaneously, and at a reduced cost.

SUMMARY

Embodiments disclosed herein generally relate to a system and method for tensioning a bolt. The bolt tensioning system may be used with variable length connection members, for example studs, in any one or more of the drilling, subsea, and process industries to couple a first member to a second member. The bolt tensioning system may remain coupled to the first member and the second member, while applying tension to all of the bolts at the same time, rather than having to torque or tension each bolt individually. The bolt system may accurately and uniformly tension all bolts in a single operation to provide reliable connections.

In one embodiment, a tensioning device configured to couple a first member to a second member is disclosed. The tensioning device includes a housing, a biasing member disposed in the housing, and a piston disposed in the housing. The tensioning device may include a connection member coupled to the piston, wherein the connection member extends out of the housing, wherein the piston is moveable in a first direction by pressurized fluid, and wherein the piston is moveable in a second direction by the biasing member to tension the connection member.

In another embodiment, a tensioning system configured to couple a first member to a second member is disclosed. The tensioning system includes a plurality of tensioning devices and a connector. Each tensioning device includes a housing, a biasing member disposed in the housing, a piston coupled to the housing, and a connection member coupled to the piston. The connection member extends out of the housing. The piston is moveable in a first direction by a pressurized fluid and the piston is moveable in a second direction by the biasing member to tension the connection member. The connector is operatively connected to a pump for supplying the pressurized fluid to each of the pistons.

In yet another embodiment, a method for tensioning a device to couple a first member to a second member is disclosed. The method includes coupling the first member to the second member by a plurality of connection members that extend through the first member and the second member, wherein each connection member is coupled to a piston that is disposed in a housing. The method further includes supplying pressurized fluid against the piston, which compresses a biasing member disposed in the housing. The method further includes releasing the pressurized fluid such that the biasing member applies a tension force to the connection member via the piston.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numerals have been used, where applicable, to designate identical elements that are common between figures. Additionally, elements of one embodiment may be advantageously adapted for utilization in other embodiments described herein.

DETAILED DESCRIPTION

Embodiments disclosed herein generally relate to a system and method for tensioning a bolt. The bolt tensioning system may be used with variable length connection members in any one or more of the drilling, subsea, and process industries to couple a first member to a second member. The bolt tensioning system may remain coupled to the first member and the second member, while applying tension to all of the bolts at the same time, rather than having to torque or tension each bolt individually. The bolt system may accurately and uniformly tension all bolts in a single operation to provide reliable connections.

Figure 1:
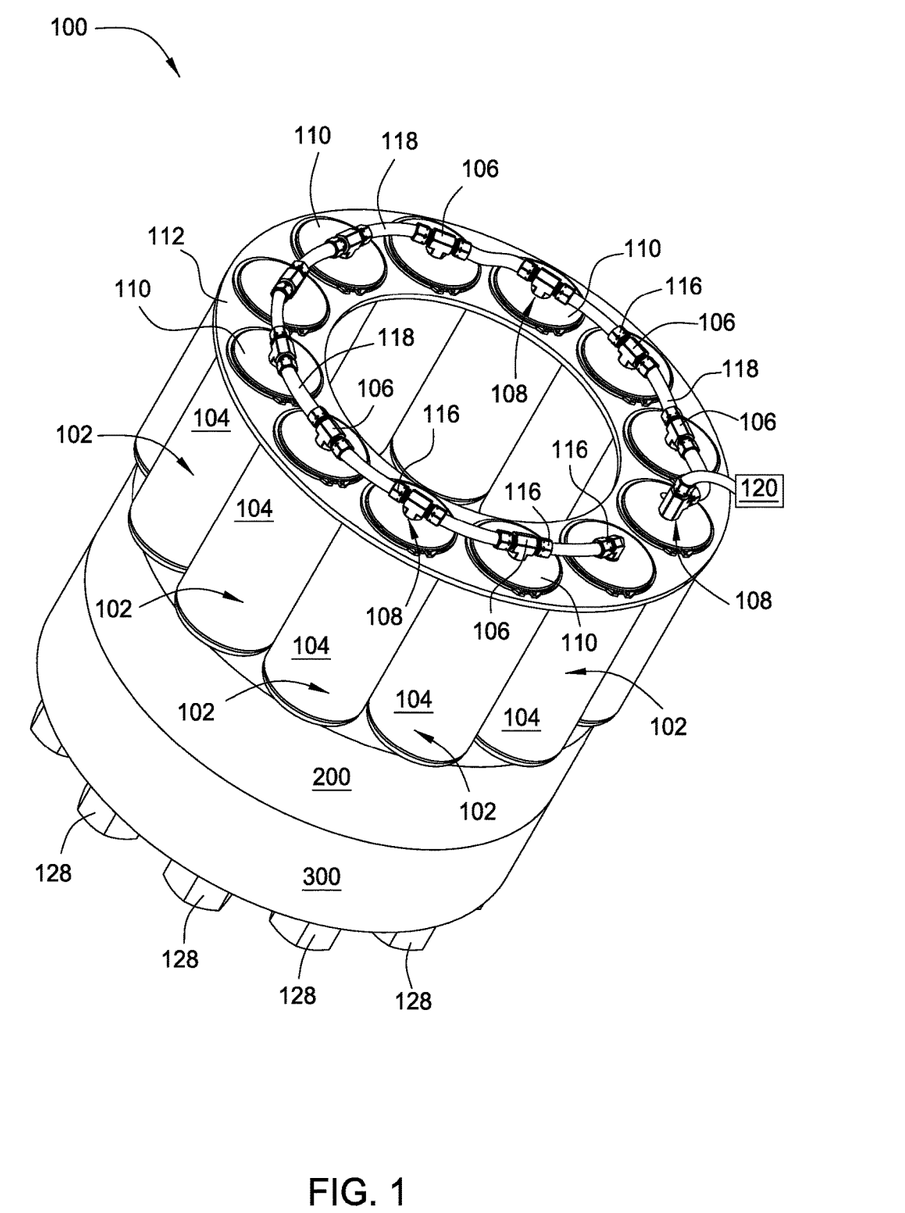
FIG. 1 is a schematic isometric view of a tensioning system with fittings, according to one embodiment.
Figure 2:
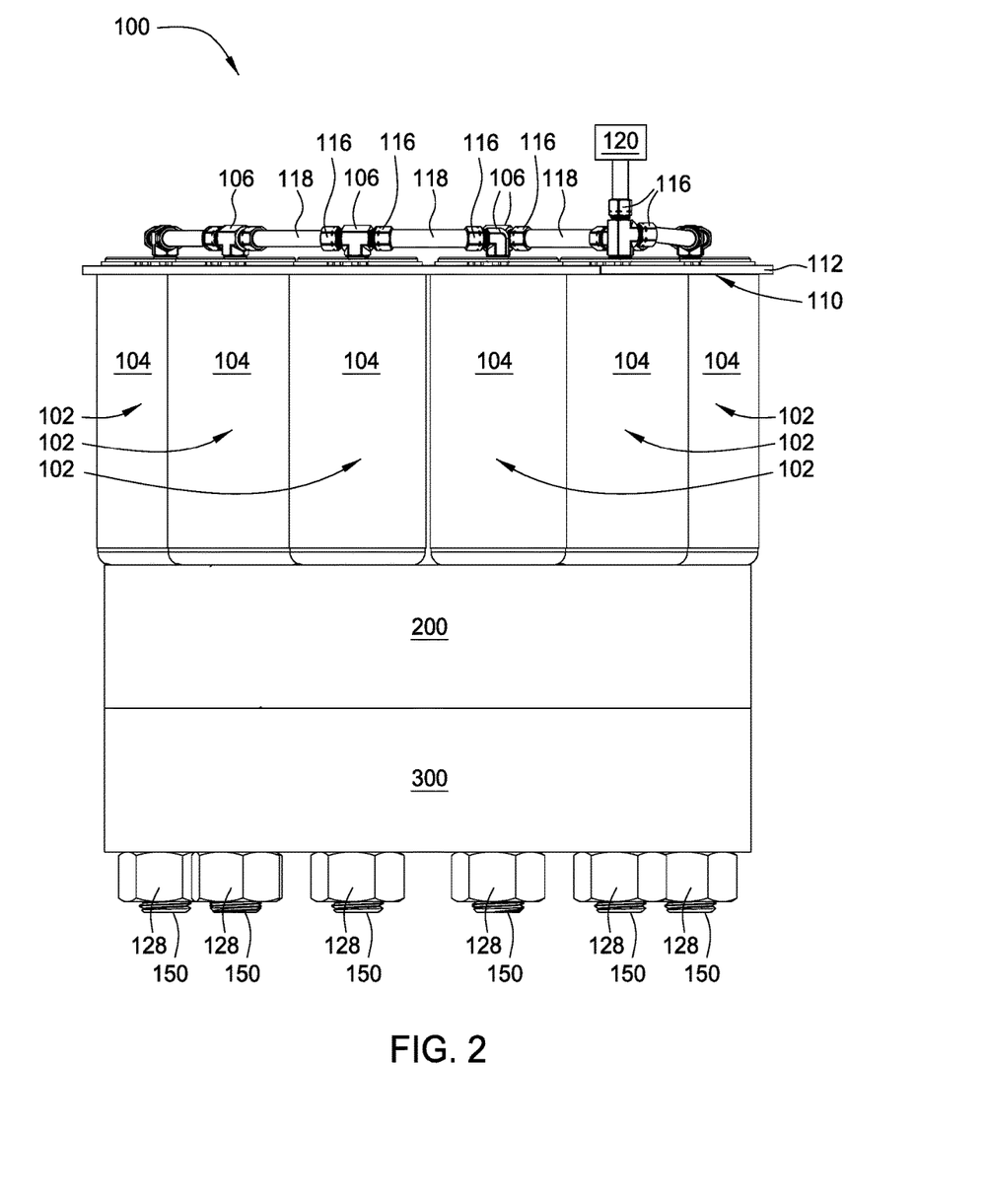
FIG. 2 is a schematic side view of the tensioning system of FIG. 1, according to one embodiment.

FIGS. 1 and 2 are a schematic isometric view and a schematic side view, respectively, of a tensioning system 100 configured to connect a first member 200 to a second member 300, according to one embodiment. The tensioning system 100 includes at least one tensioning device 102, and in some embodiments, including that shown in FIG. 1, the tensioning system 100 includes a plurality of tensioning devices 102. Although twelve tensioning devices 102 are shown in the tensioning system 100 of FIG. 1, the tensioning system 100 may include any number of tensioning devices 102.

Each tensioning device 102 includes a housing 104 and a connector 106 coupled to the housing 104. The housing 104 may be positioned on either side of the first member 200 or the second member 300. The housing 104 may enclose the additional components of the tensioning device 102 as further discussed below. The housing 104 may be cylindrical in shape; however, it is contemplated that the housing 104 may be of any suitable shape. The housing 104 may comprise a metal material, a plastic material, a composite material, combinations and mixtures thereof, and/or any other suitable material. The housing 104 may include a hole 108 bored through a first end 110 of the housing 104 to allow fluid to enter and/or exit the housing 104. The fluid may be a liquid, a gas, or a combination or mixture thereof.

The connector 106 may be coupled to the housing 104 at the first end 110 of the housing 104. In some embodiments, the connector 106 may be coupled to the housing 104 via the hole 108. The connector 106 may be coupled to the housing 104 via a threaded connection with the hole 108, and/or by any other suitable types of connections. The connector 106 is configured to simultaneously pump pressurized fluid and/or direct pressurized fluid into and/or out of the respective housing 104.

Each connector 106 comprises a plurality of fittings 116. Each fitting 116 may include an opening for allowing fluid to pass through. Each connector 106 further includes at least one hose 118. Each fitting 116 may be coupled to a hose 118. Each hose 118 may transfer fluid between connectors 106, such that fluid can be drawn into and/or removed from each housing 104 simultaneously. Fluid may be stored in and/or supplied to at least one connector 106 from a fluid storage tank 120. Fluid may further be transferred between connectors 106 via each hose 118.

The tensioning system 100 further includes a locating device 112. The locating device 112 includes a plurality of holes to support the tensioning devices 102. Each tensioning device 102 may be coupled to the locating device 112 such that each tensioning device 102 extends through a hole in the locating device 112 near the first end 110 of the housing 104. Each housing 104 may further include a clip 124 (shown in FIG. 3) to couple each housing 104 to the locating device 112. The locating device 112 may secure each tensioning device 102 thereto within the tensioning system 100.

The tensioning system 100 is configured to couple a first member 200 to a second member 300 via at least one connection member 150 (shown in FIG. 3) that is tensioned by at least one of the tensioning devices 102 of the tensioning system 100. The connection member 150 may be secured to the first member 200 and the second member 300 by a nut 128. In one embodiment, the connection member 150 may be a stud onto which the nut 128 is threaded. In one embodiment, the connection member 150 may be a single piece, such as a specialized bolt, that does not require the nut 128 as a separate component. In some examples, the first member 200 may be a flanged end of a first tubular, and the second member 300 may be a flanged end of a second tubular. For purposes of clarity, however, the first and second tubulars have been removed from the Figures and only the respective flanged ends are shown, by way of example only, as the first member 200 and the second member 300, respectively.

Figure 3:
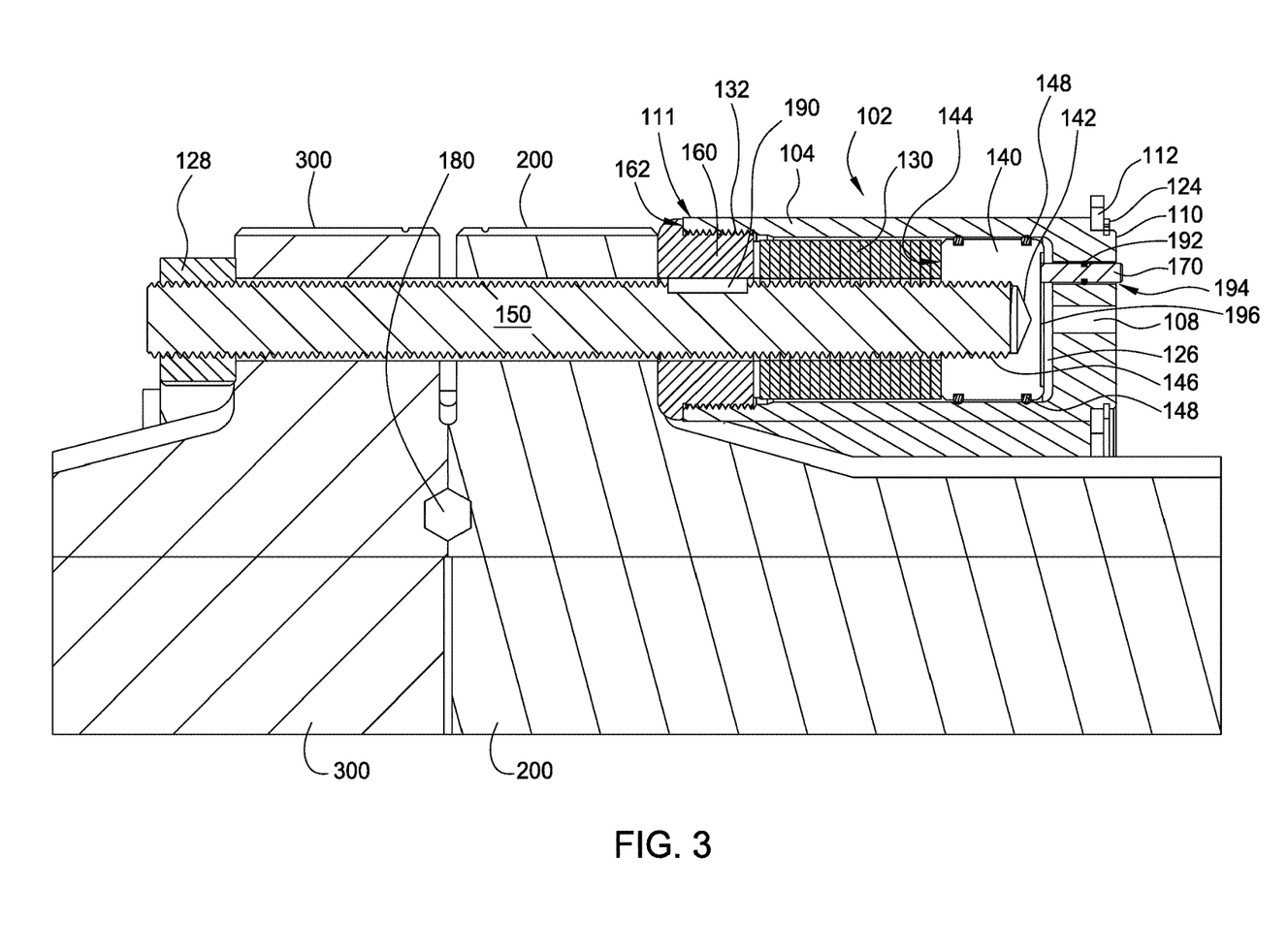
FIG. 3 is a schematic cross-sectional view of the tensioning system of FIGS. 1 and 2, according to one embodiment.

The tensioning system 100 may be coupled to the first member 200 or may be coupled to the second member 300. The nut 128, when coupled to the connection member 150 as a separate component, may be coupled to the first member 200 or may be coupled to the second member 300 on the side opposite the housing 104 of the tensioning system 100.

FIG. 3 is a schematic cross-sectional view of one tensioning device 102 of FIG. 1 configured to couple the first member 200 to the second member 300. The tensioning device 102 may include a biasing member 130, a piston 140, and the connection member 150. The biasing member 130 and/or the piston 140 may be disposed in the housing 104.

In one embodiment, the biasing member 130 may be a spring. The biasing member 130 is configured to apply a force to the piston 140. The biasing member 130 is configured to expand and/or contract due to movement of the piston 140. The biasing member 130 is disposed between the piston 140 and a cover nut 160, and may be compressed and/or allowed to expand between the side walls of the housing 104. In one embodiment, the biasing member 130 may be cylindrical or circular in shape; however the biasing member 130 may be of any suitable shape. The biasing member 130 may extend along a length of the housing 104. Furthermore, the biasing member 130 may comprise a hollow core such that the connection member 150 extends through the biasing member 130. The biasing member 130 may be comprised of a metallic material, a composite material, a plastic material, combinations and mixtures thereof, and/or any other suitable material.

The piston 140 is disposed between the biasing member 130 and the hole 108 formed through the end of the housing 104. The piston 140 may include a threaded bore 142 that extends partially into the piston 140. The threaded bore 142 may extend through a first face 144 in the piston and extend inward into the piston 140 therefrom, wherein the first face 144 is directed towards the biasing member 130. The connection member 150 is coupled to the threaded bore 142 via the threads 146. Movement of the piston 140 may be guided by the side walls of the housing 104. The piston 140 may include a plurality of seals 148 coupled thereto and disposed between the piston 140 and the housing 104. The plurality of seals 148 may prevent the piston 140 from contacting the housing 104 and/or provide a fluid tight connection therebetween.

The piston 140 is moveable in a first direction and in a second direction, wherein the second direction is opposite the first direction. The piston 140 is moveable in the first direction by a pressurized fluid. The piston 140 is moveable in the second direction by the biasing member 130 to tension the connection member 150 with the nut 128 as further discussed below.

The housing 104 may further include a reservoir 126. The reservoir 126 may be disposed between the hole 108 and the piston 140. The hole 108 may direct fluid into and/or out of the reservoir 126 via the connector 106 (shown in FIGS. 1 and 2), as the connector 106 is configured to direct and/or pump pressurized fluid to each of the pistons 140 simultaneously. As the reservoir 126 fills with pressurized fluid, the pressurized fluid exerts a force upon the piston 140 which moves the piston 140 in a first direction to compress the biasing member 130. As the reservoir 126 is emptied of pressurized fluid, a force applied by the biasing member 130 against the piston 140 moves the piston 140 in a second direction, wherein the second direction is opposite the first direction, to expand the biasing member 130, and thereby simultaneously apply a tension force to each of the connection members 150 as further described below.

The connection member 150 is coupled to the piston 140 inside the housing 104. The connection member 150 extends through a hole bored in each of the first member 200 and the second member 300 and into the housing 104 to couple with the piston 140. One or both ends of the connection member 150 may be threaded. The connection member 150 may be coupled to the piston 140 via the threads 146 of the threaded bore 142. The connection member 150 further extends out of the housing 104 and is coupled to the nut 128 via a threaded connection, such as a plurality of screw threads. The connection member 150 provides support for coupling the first member 200 to the second member 300. In some embodiments, the connection member 150 may comprise a metal material.

In one embodiment, the nut 128 may be integrally formed with the connection member 150 as a single piece. In one embodiment, the piston 140 may be integrally formed with the connection member 150 as a single piece. In one embodiment, the nut 128, the piston 140, and the connection member 150 may all be integrally formed as a single piece.

The tensioning device 102 further comprises a cover nut 160 disposed at least partially within the housing 104. A second end 111 of the housing 104 may be an open end and comprise a threaded sidewall 132. The cover nut 160 may be partially threaded and thread into the threaded sidewall 132 of the housing 104 to couple the cover nut 160 to the housing 104. In some embodiments, the cover nut 160 is coupled to the housing 104 via the threaded connection. The lip 162 prevents the cover nut 160 from fully inserting into the housing 104. The cover nut 160 contacts the biasing member 130 within the housing 104 and may contact the first member 200. The cover nut 160 further comprises a hole bored therein to allow the connection member 150 to pass therethrough freely. The cover nut 160 may comprise a metal material.

Furthermore, in some embodiments, the tension device 102 may comprise a cover nut disposed on each end of the housing 104 to enclose the connection member 150 within the housing 104. Each cover nut may be partially threaded and thread into the sidewalls, such as the threaded sidewall 132, of the housing 104. The lip 162 may prevent each cover nut from being fully inserted into the housing 104.

The tensioning device 102 may further include an anti-rotation device 170 to prevent rotation of the piston 140 relative to the housing 104. The anti-rotation device 170 may be disposed through an opening 194 formed in the housing 104 at the first end 110. The anti-rotation device 170 may extend through the reservoir 126 and into a recess 196, such as a slot or groove, formed in the piston 140. An o-ring 192 may be disposed in the opening 194 to form a seal between the anti-rotation device 170 and the housing 104. In one embodiment, the anti-rotation device 170 may be a pin or a rod.

In one embodiment, the anti-rotation device 170 may be used to measure the tension applied to the connection member 150, as shown in FIG. 3. For example, the anti-rotation device 170 may extend a distance out of or from (or alternatively may be recessed into) the housing 104 via the opening 194. A measurement of the extended (or recessed) distance of the anti-rotation device 170 relative to the housing 104 may be used to provide a measurement of the actual tension applied to the connection member 150, or a ratio may be calculated between distance and tension. The measurement of the extended (or recessed) distance may indicate how far the piston 140 has moved, as well as how much the biasing member 130 has been compressed, which may be used to calculate the amount of tension on the biasing member 130 and the connection member 150. By way of further example, when the anti-rotation device 170 is flush with the first end 110 of the housing 104, this may indicate that the appropriate tension has been applied to the connection member 150, as shown in FIG. 6B.

In some embodiments, at least one high pressure seal 180 may be disposed between the first member 200 and the second member 300. The high pressure seal 180 may prevent the first member 200 and the second member 300 from rubbing together, moving, and/or sliding, as well as prevent anything from passing therebetween. The high pressure seal 180 may comprise a rubber material, a composite material, a plastic material, combinations and mixtures thereof, and/or any other suitable sealing material.

In some embodiments, and as shown in FIG. 3, a tension measurement device 190 may be disposed in the housing 104. The tension measurement device 190 may be one or more sensors and/or transducers, such as a strain gauge or load cell, configured to measure the tension applied to the connection member 150. In some embodiments, the tension measurement device 190 may be disposed within or adjacent the connection member 150 and/or the cover nut 160. In some embodiments, the tension measurement device 190 may be coupled to the connection member 150, the biasing member 130, the piston 140, and/or the housing 104. The tension measurement device 190 may be a mechanical device, an electronic device, and/or other types of devices configured to measure the tension applied to the connection member 150.

Figure 4:
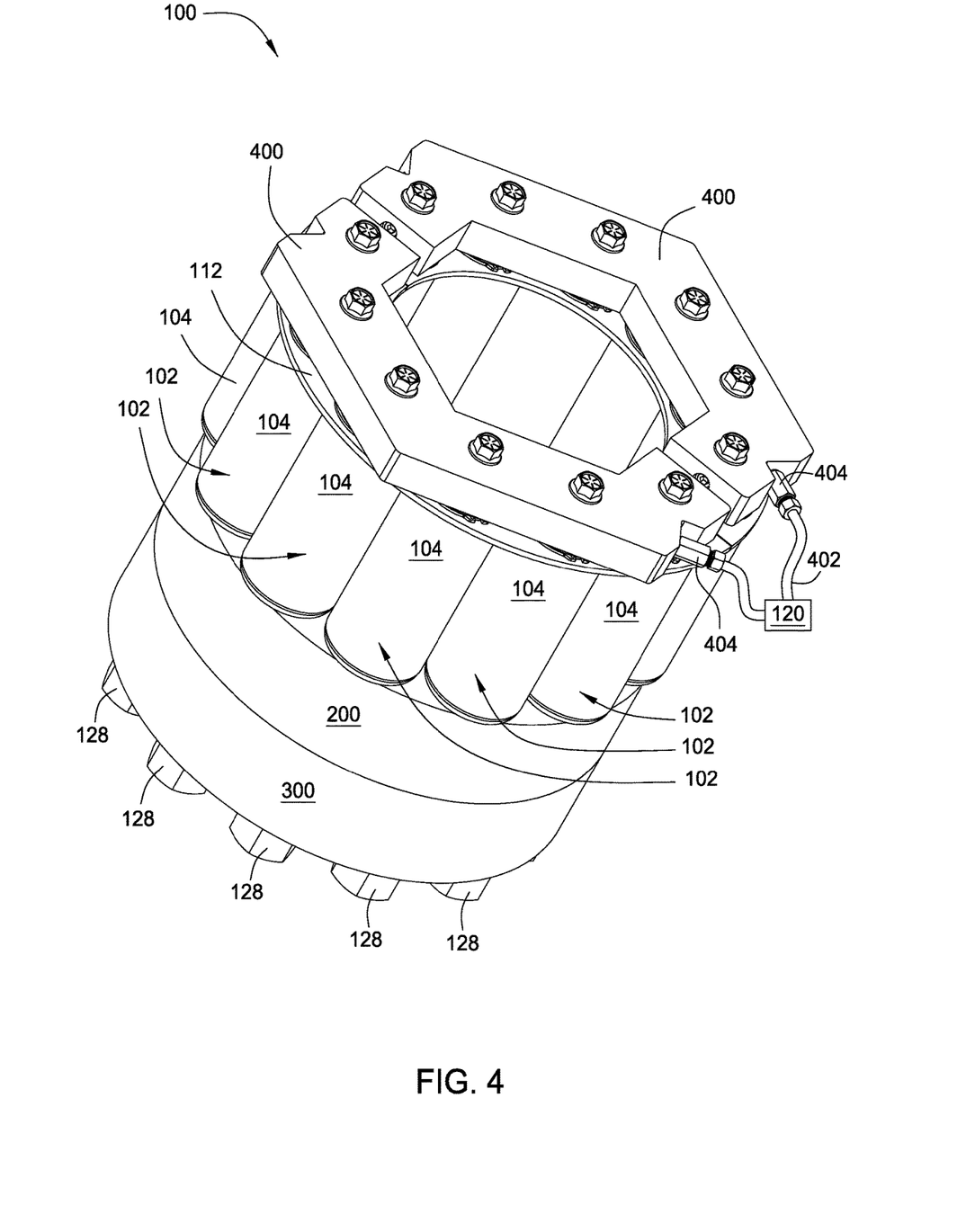
FIG. 4 is a schematic isometric view of a tensioning system with a manifold, according to one embodiment.
Figure 5:
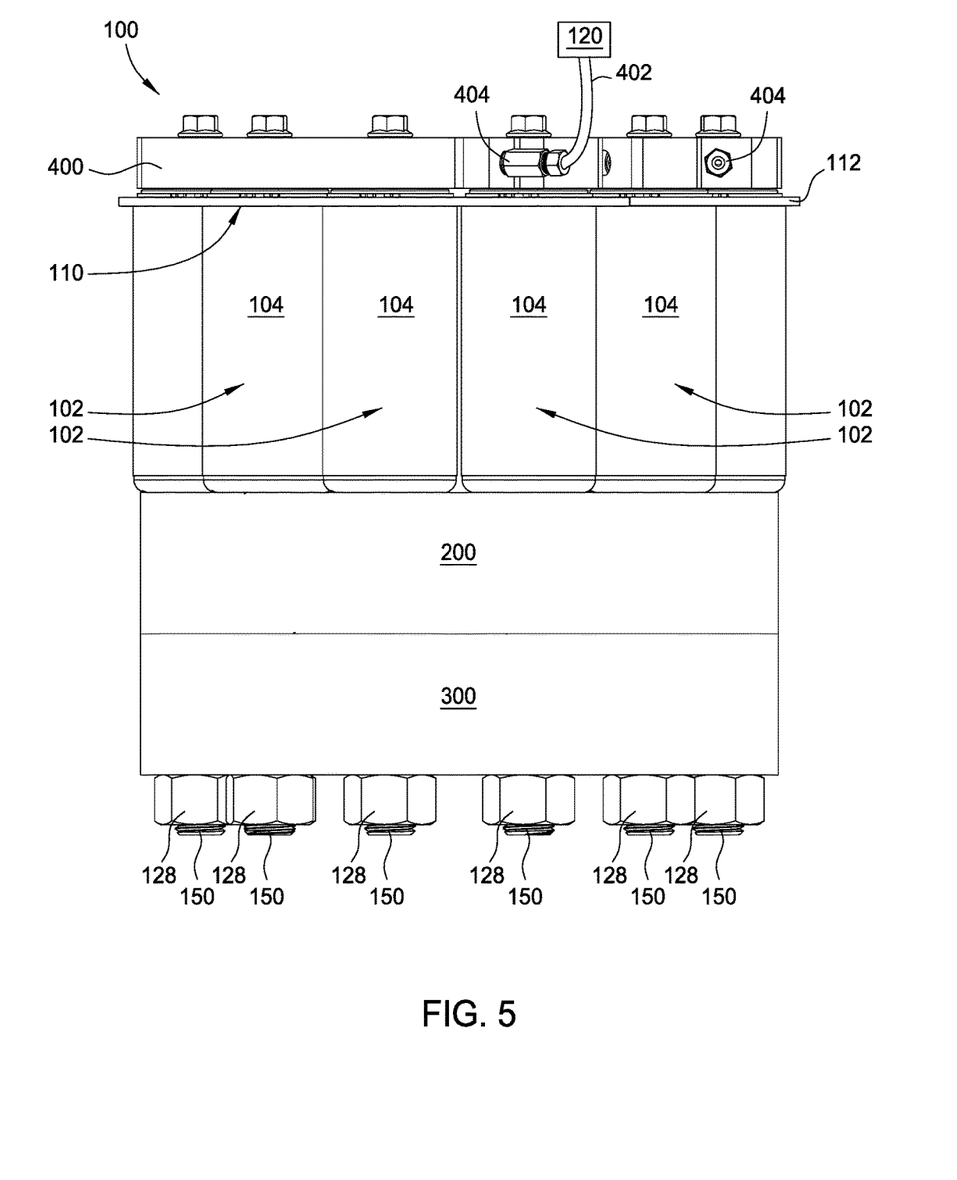
FIG. 5 is a schematic side view of the tensioning system of FIG. 4, according to one embodiment.

FIGS. 4 and 5 are a schematic isometric view and a schematic side view, respectively, of the tensioning system 100 with a manifold 400, according to one embodiment. The manifold 400 may optionally replace the fittings 116 and hoses 118 of the embodiment of FIGS. 1, 2, and 3. The manifold 400 may be coupled to the tensioning system 100 via a plurality of bolts or other suitable connection means. The manifold 400 may be a single manifold as shown in FIGS. 4 and 5, however it is contemplated that the manifold 400 may comprise two or more connected manifold pieces. The manifold 400 may be further coupled to each piston 140 via each housing 104. The manifold 400 may comprise a plurality of lines that branch from the manifold connector 404 to each housing 104. Furthermore, the manifold 400 is configured to simultaneously distribute and/or pump pressurized fluid to and/or from each of the pistons 140. Pressurized fluid may be supplied to the manifold 400 from the fluid storage tank 120 via a hose 402 operatively connected to at least one manifold connector 404. The locating device 112 may be disposed between the manifold 400 and the housing 104, and in some embodiments, the manifold 400 may be coupled to the locating device 112. Furthermore, in some embodiments, the locating device 112 and the manifold 400 may be integrated as a single piece.

Figure 6A:
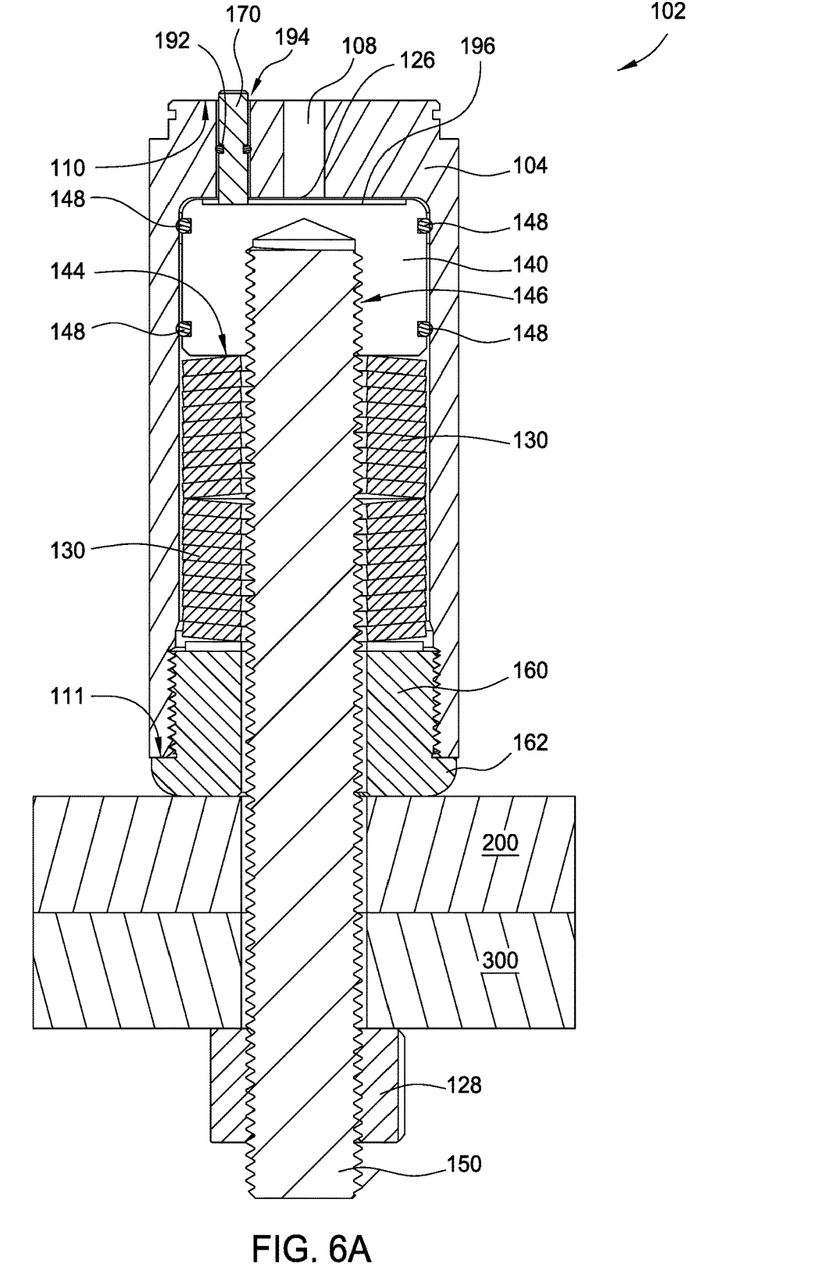
FIG. 6A is a schematic cross-sectional view of one tensioning device in an uncompressed state, according to one embodiment.
Figure 6B:
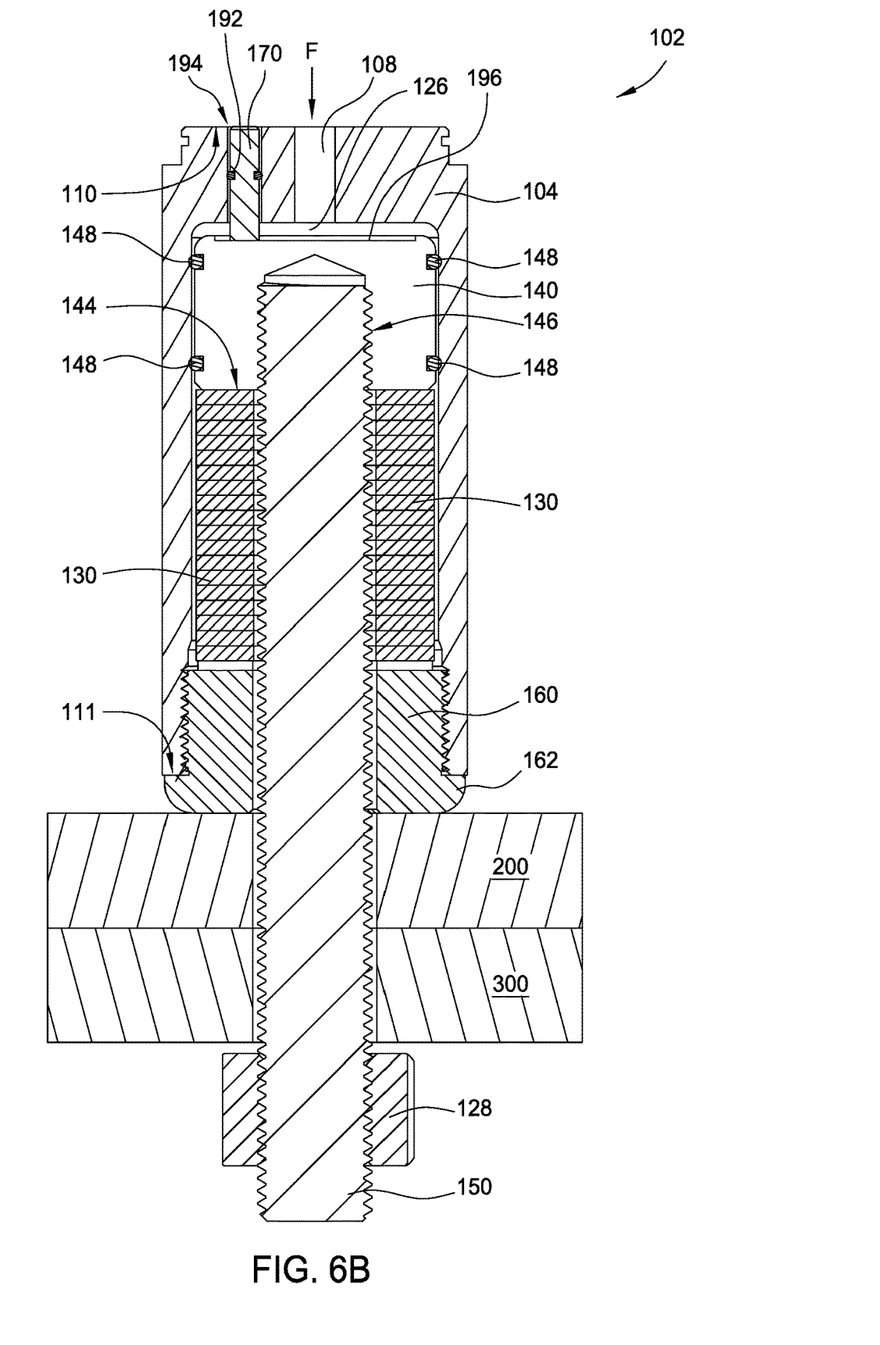
FIG. 6B is a schematic cross-sectional view of the tensioning device in a compressed state, according to one embodiment.

FIG. 6A schematically illustrates a cross-sectional view of one tensioning device 102 having the biasing member 130 in an uncompressed state, according to one embodiment. As shown, the connection member 150 is inserted into the housing 104 and coupled to the piston 140. As described above, the connection member 150 may be coupled to the piston 140 by a threaded connection. For example, the connection member 150 may be threaded into the threaded bore 142 of the piston 140. The biasing member 130 is uncompressed as no pressurized fluid is present in the reservoir 126, and as such, the piston 140 is at a first position. The connection member 150 extends out of the housing 104 and is coupled to the nut 128. The first member 200 is coupled to the second member 300 via the connection member 150 disposed through the first member 200 and the second member 300, while the biasing member 130 remains in an uncompressed state. As further shown in FIG. 6A, the nut 128 is coupled to the connection member 150.

FIG. 6B schematically illustrates a cross-sectional view of the tensioning device 102 of FIG. 6A having the biasing member 130 in a compressed state, according to one embodiment. As shown, pressurized fluid (illustrated by reference character "F") is supplied from the fluid storage tank 120 using a pump or compressor into the reservoir 126 through the fittings 116 and hoses 118, or through the manifold 400, via the hole 108. As the reservoir 126 continues to fill with pressurized fluid, the pressurized fluid acts against the piston 140 and energizes the piston 140 to compress the biasing member 130 against the cover nut 160. As the piston 140 compresses the biasing member 130 the piston 140 is moved to a second position different than the first position. As the piston 140 compresses the biasing member 130, the connection member 150 is forced to move with the piston 140 by approximately the same distance as the compression of the biasing member 130 or the difference between the first position and the second position. As the connection member 150 is moved, the distance the connection member 150 extends out of the housing 104 continuously increases. As further shown in FIG. 6B the nut 128 remains coupled to the connection member 150.

Figure 6C:
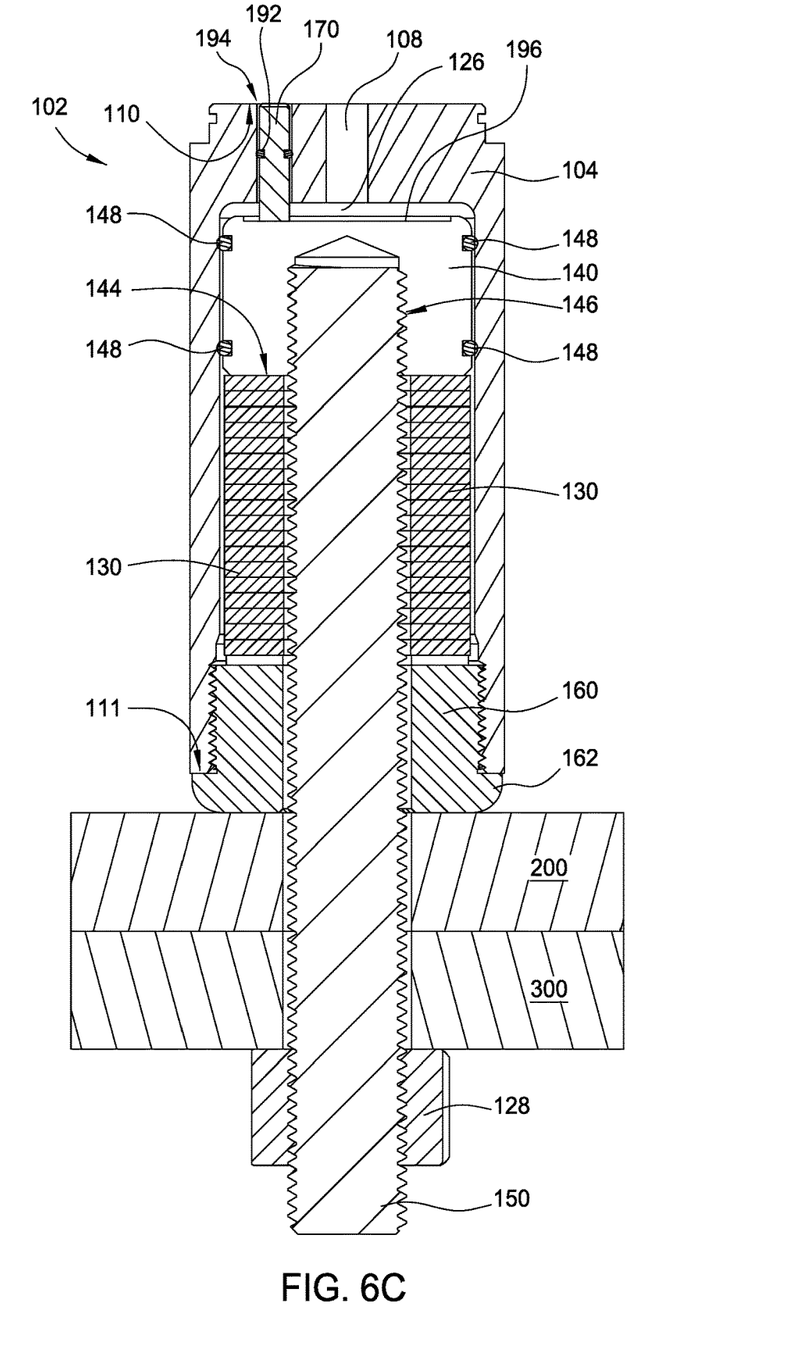
FIG. 6C is a schematic cross-sectional view of the tensioning device in a tensioned state, according to one embodiment.

FIG. 6C schematically illustrates a cross-sectional view of the tensioning device 102 of FIGS. 6A and 6B in a tensioned state, according to one embodiment. As shown, the nut 128 is tightened on the connection member 150. In some embodiments, the nut 128 is tightened on the connection member 150 until the nut 128 is flush with and/or against the second member 300. After the nut 128 is tightened on the connection member 150, the pressurized fluid is released from the reservoir 126 such that the biasing member 130 applies a force to the connection member 150 via the piston 140. The force of the biasing member 130 tensions the connection member 150, which is held in place by the nut 128, as the pressurized fluid is released from the reservoir 126

In order to untension the nut 128 and/or the connection member 150, a similar method may be performed. As such, pressurized fluid may be supplied against the piston 140, wherein the pressurized fluid energizes the piston 140 to compress the biasing member 130. Once the biasing member 130 is sufficiently compressed, the nut 128 may be loosened and/or removed from the connection member 150. The pressurized fluid may then be released, thus returning the biasing member 130 to a relaxed state.

Benefits of the tensioning system 100 include a universal bolt tensioning device that may be utilized with studs of variable length and/or size. The tensioning system 100 remains on the connected members and does not have to be removed during operation. Also, all studs/bolts can be tensioned at the same time, thus reducing tensioning time and manpower required. Furthermore, the tensioning system 100 may be utilized onshore, offshore, and/or with subsea applications. The tensioning system 100 also allows for the measuring of the bolt tension via mechanical, electronic, and/or other types of device.

Additional benefits include increased safety to personnel, as reduced occupational hazards exist, increased time savings, reduced operational costs, and a reduced operational footprint. Furthermore, bolts are accurately, precisely, and uniformly tensioned thus reducing and/or preventing leaks, preventing rupture damage, and preventing environmental hazards.

Other and further embodiments may be devised without departing from the basis scope thereof, and the scope thereof is determined by the claims that follow.

The invention claimed is:

1. A tensioning system configured to couple a first member to a second member, comprising:
   a first tensioning device in fluid communication with a second tensioning device, wherein each tensioning device comprises:
   a housing;
   a biasing member disposed in the housing;
   a piston disposed in the housing;
   an anti-rotation device configured to prevent rotation of the piston relative to the housing, wherein the anti-rotation device comprises a pin that is disposed through the housing and extends into a recess formed in the piston, and wherein the pin is configured to provide an indication of the amount of tension applied to the connection member based on the distance the pin extends out of the housing; and
   a connection member coupled to an end of the piston opposite from the recess, wherein a portion of the connection member extends out of one end of the housing and through the first and second members, wherein the piston is moveable in a first direction by pressurized fluid that is supplied into the housing at an opposite end of the housing, and wherein the piston is moveable in a second direction by the biasing member to tension the connection member and couple the first and second members together; and
   a connector coupled to the housings and configured to simultaneously distribute pressurized fluid into the housings.

2. The tensioning system of claim 1, wherein each tensioning device further comprises a tension measuring device configured to measure the tension applied to the connection member.

3. The tensioning system of claim 1, wherein each tensioning device further comprises a plurality of seals disposed between the piston and the housing.

4. The tensioning system of claim 1, wherein the biasing member is configured to apply a force to the piston.

5. The tensioning system of claim 4, wherein the biasing member is a spring.

6. The tensioning system of claim 1, wherein each housing is coupled to at least one of the first member and the second member.

7. The tensioning system of claim 1, further comprising at least one locating device and at least one clip for coupling the housings together.

8. The tensioning system of claim 1, wherein the connection member is coupled to the piston by a plurality of threads.

9. The tensioning system of claim 1, wherein a nut is threadedly coupled to an end of the portion of the connection member that extends out of the housing.

10. The tensioning system of claim 1, wherein the connector is operatively connected to a pump to supply the pressurized fluid to the housings.

11. The tensioning system of claim 1, wherein the connector comprises a fitting connected to each housing and a hose connected to each fitting to supply the pressurized fluid to the housings.

12. The tensioning system of claim 1, wherein the connector is a single manifold configured to simultaneously distribute pressurized fluid into the housings.

13. A method for tensioning a device to couple a first member to a second member, comprising:

coupling the first member to the second member by a plurality of connection members that extend through the first member and the second member, wherein each connection member is coupled to a piston that is disposed in a housing;

supplying pressurized fluid into the housing at an end of the housing opposite from the connection member and against the piston, which compresses a biasing member disposed in the housing;

tightening a nut onto an end of the connection members opposite from the piston;

releasing the pressurized fluid after tightening the nut onto the end of the connection members such that the biasing member applies a tension force to the connection member via the piston; and measuring an amount of distance that a pin extends from or is recessed into the housing to calculate the tension force applied by the biasing member to the connection member via the piston, wherein the pin is also configured to prevent rotation of the piston relative to the housing.

14. The method of claim 13, further comprising simultaneously supplying the pressurized fluid against each piston, and simultaneously releasing the pressurized fluid to place each connection member in tension at the same time.

* * * * *